(12) United States Patent
Eo et al.

(10) Patent No.: US 11,112,006 B2
(45) Date of Patent: Sep. 7, 2021

(54) AUTOMATIC TRANSMISSION FOR VEHICLE

(71) Applicants: Hyundai Motor Company, Seoul (KR); Kia Motors Corporation, Seoul (KR)

(72) Inventors: Soon Ki Eo, Ansan-si (KR); Woo Jin Chang, Suwon-si (KR); Sun Sung Kwon, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 786 days.

(21) Appl. No.: 15/978,674

(22) Filed: May 14, 2018

(65) Prior Publication Data

US 2019/0162300 A1     May 30, 2019

(30) Foreign Application Priority Data

Nov. 27, 2017   (KR) ........................ 10-2017-0159180

(51) Int. Cl.
   *F16H 61/02*         (2006.01)
   *F16H 63/04*         (2006.01)
   (Continued)

(52) U.S. Cl.
   CPC ......... *F16H 61/0295* (2013.01); *F16D 23/10* (2013.01); *F16H 63/04* (2013.01); *F16H 63/30* (2013.01); *F16H 2708/18* (2013.01)

(58) Field of Classification Search
   CPC ............... F16D 23/12; F16D 2023/141; F16D 43/06–12; F16H 61/0293–0295; F16H 63/04–067; F16H 2708/18
   See application file for complete search history.

(56) References Cited

U.S. PATENT DOCUMENTS

| | | | |
|---|---|---|---|
| 2,189,748 A | | 2/1940 | Wilson |
| 4,637,270 A | * | 1/1987 | Yanagiuchi ............. F16H 3/089 |
| | | | 477/108 |

(Continued)

FOREIGN PATENT DOCUMENTS

| | | |
|---|---|---|
| FR | 2545883 A1 | 11/1984 |
| JP | 5909135 B2 | 4/2016 |

(Continued)

*Primary Examiner* — David R Morris
(74) *Attorney, Agent, or Firm* — Morgan, Lewis & Bockius LLP (57) ABSTRACT

An automatic transmission may include rotation shaft, sliding unit mounted on the rotation shaft and slidable up and down along the rotation shaft, diaphragm spring coupled to the sliding unit and deformed to be oriented toward first or second end of the rotation shaft along the rotation shaft according to position of the sliding unit, shift fork connected to the sliding unit or the diaphragm spring and configured to cause synchronizer to engage with speed change gear according to the position of the sliding unit, sliding-unit position adjuster connected to the sliding unit and adjusting the position of the sliding unit by causing the sliding unit to slide up or down along the rotation shaft, and controller for controlling the sliding-unit position adjuster to adjust elastic force of the diaphragm spring according to the vehicle speed by causing the sliding unit to slide upward or downward along the rotation shaft.

10 Claims, 6 Drawing Sheets

(51) Int. Cl.
*F16D 23/10* (2006.01)
*F16H 63/30* (2006.01)

(56) References Cited

U.S. PATENT DOCUMENTS

| | | | |
|---|---|---|---|
| 4,809,823 A | 3/1989 | Fargier | |
| 5,997,432 A * | 12/1999 | Neubauer | ............... F16H 61/24 |
| | | | 477/88 |
| 10,415,658 B2 * | 9/2019 | Eo | ........................... F16D 23/02 |
| 2019/0032731 A1 * | 1/2019 | Eo | ........................... F16D 23/02 |
| 2019/0162299 A1 * | 5/2019 | Eo | ........................ F16H 61/0295 |

FOREIGN PATENT DOCUMENTS

| | | |
|---|---|---|
| KR | 10-1995-0027229 A | 10/1995 |
| KR | 10-0580845 B1 | 5/2006 |
| KR | 10-2015-0077732 A | 7/2015 |

\* cited by examiner

AUTOMATIC TRANSMISSION FOR VEHICLE

CROSS REFERENCE TO RELATED APPLICATION

The present application claims priority to Korean Patent Application No. 10-2017-0159180, filed Nov. 27, 2017, the entire contents of which is incorporated herein for all purposes by this reference.

BACKGROUND OF THE INVENTION

Field of the Invention

The present invention relates to a transmission for a vehicle and, more particularly, to an automatic transmission for a vehicle.

Description of Related Art

An automatic transmission is realized by combining a plurality of planetary gear sets. An automatic transmission functions to automatically convert rotational power transmitted from a torque converter according to multiple gear ratios and transmit the resulting power to an output shaft. Furthermore, since an automatic transmission is capable of implementing a more appropriate gear ratio as the number of gear positions that can be implemented is greater, it is possible to realize a vehicle excellent in power performance and fuel economy. Accordingly, steady research has been conducted to realize more gear positions.

A vehicle disposed with an automatic transmission automatically performs gear shifting based on a predetermined shift pattern. More specifically, the gear shifting is performed to reach a target speed by controlling a plurality of synchronizers to be engaged or disengaged according to the vehicle speed and the accelerator pedal depression amount on the basis of a predetermined shift pattern.

However, in order to accomplish this, required is a controller for controlling a plurality of synchronizers to be engaged with or disengaged from a target speed gear based on data detected by a vehicle speed detector, an accelerator pedal detector (APS) and the like and based on a predetermined shift pattern.

The information disclosed in the present Background of the Invention section is only for enhancement of understanding of the general background of the invention and may not be taken as an acknowledgement or any form of suggestion that the present information forms the prior art already known to a person skilled in the art.

BRIEF SUMMARY

Various aspects of the present invention are directed to providing and an objective of the present invention is directed to providing an automatic transmission for a vehicle, the transmission facilitating automatic gear shifting by causing multiple synchronizers to engage with or disengage from a target speed gear through a mechanical operation according to a vehicle speed, without being provided with an electronic controller for allowing a plurality of synchronizers to engage with or disengage from a target speed gear through electronic control for a vehicle speed change.

Various aspects of the present invention are directed to providing an automatic transmission for a vehicle, the transmission including: a rotation shaft rotated by driving power of a vehicle; a sliding device mounted on the rotation shaft and configured to slide up and down along an axial direction of the rotation shaft; a diaphragm spring coupled to the sliding device and deformed toward a first end portion or a second end portion of the rotation shaft in the axial direction thereof, according to a position of the sliding device; a shift fork connected to the sliding device or the diaphragm spring and configured to cause a synchronizer to engage with a speed change gear according to the position of the sliding device; a sliding-device position adjuster connected to the sliding device and adjusting the position of the sliding device by causing the sliding device to slide up and down along the axial direction of the rotation shaft; and a controller for controlling the sliding-device position adjuster according to a speed of the vehicle to adjust an elastic force of the diaphragm spring by causing the sliding device to slide up and down along the axial direction of the rotation shaft.

The automatic transmission for a vehicle may further include a first link having a first end portion connected to the rotation shaft by a hinge and a second end portion raised or lowered by centrifugal force when the rotation shaft rotates; a second link having a first end portion connected to the first link by a hinge and a second end portion connected to the sliding device to cause the sliding device to slide upward or downward when the first link is raised or lowered; a first linkage portion mounted on the rotation shaft and connected to the first end portion of the first link by a hinge; a second linkage portion mounted on the rotation shaft, positioned below the first linkage portion, and connected to the second end portion of the second link by a hinge, and coupled to the sliding device at a bottom surface thereof; and a compression spring mounted on the rotation shaft and disposed between the first linkage portion and the second linkage portion and configured to exert an elastic force.

The sliding-device position adjuster may adjust the elastic force of the diaphragm spring by adjusting a position of the sliding device by causing the sliding device to slide upward or downward along the axial direction of the rotation shaft.

The controller may be configured to control the sliding-device position adjuster according to a speed of the vehicle to adjust the position of the sliding device by causing the sliding device to slide upward or downward along the axial direction of the rotation shaft, adjusting the elastic force of the diaphragm spring.

The sliding-device position adjuster may include a motor; a cam gear connected to the motor; and a position adjuster connected to the cam gear and the sliding device to rotate the cam gear when the motor rotates, causing the sliding device to slide upward or downward along the axial direction of the rotation shaft.

The sliding-device position adjuster may include a position adjuster coupled to the sliding device and positioned below the sliding device; a cylinder positioned between the sliding device and the position adjuster; a pressure providing device configured to provide a pressure applied to the cylinder; and a piston provided in the cylinder and above the position adjuster and configured to move up or down when the pressure is applied to the cylinder to cause the sliding device to slide upward or downward.

When a deformation amount of the diaphragm spring reaches a predetermined level, the diaphragm spring may be deformed to be oriented toward a first end portion or a second end portion of the rotation shaft in the axial direction of the rotation shaft, and a shift fork may be connected to the diaphragm spring or the sliding device so that a synchronizer starts engaging with a speed change gear at a time point when the diaphragm spring is deformed.

The shift fork may be fixedly coupled to the diaphragm spring or the sliding device to be collectively slidable.

According to an exemplary embodiment of the present invention, automatic gear shifting for changing a vehicle speed may be performed by allowing multiple synchronizers to engage with or disengage from a speed change gear through a mechanical operation that occurs according to the vehicle speed, rather than by use of an electronic controller for controlling engagement or disengagement of the multiple synchronizers.

According to an exemplary embodiment of the present invention, the controller controls the sliding-device position adjuster according to the speed of the vehicle to cause the sliding device to axially slide up and down along the rotation shaft, adjusting the elastic force of the diaphragm spring, whereby an appropriate gear shifting to one of various speed ranges may be performed.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the contrary, the invention(s) is/are intended to cover not only the exemplary embodiments of the present invention, but also various alternatives, modifications, equivalents and other embodiments, which may be included within the spirit and scope of the invention as defined by the appended claims.

Hereinbelow, various exemplary embodiments of the present invention will be described more specifically with reference to the accompanying drawings.

Figure 1:
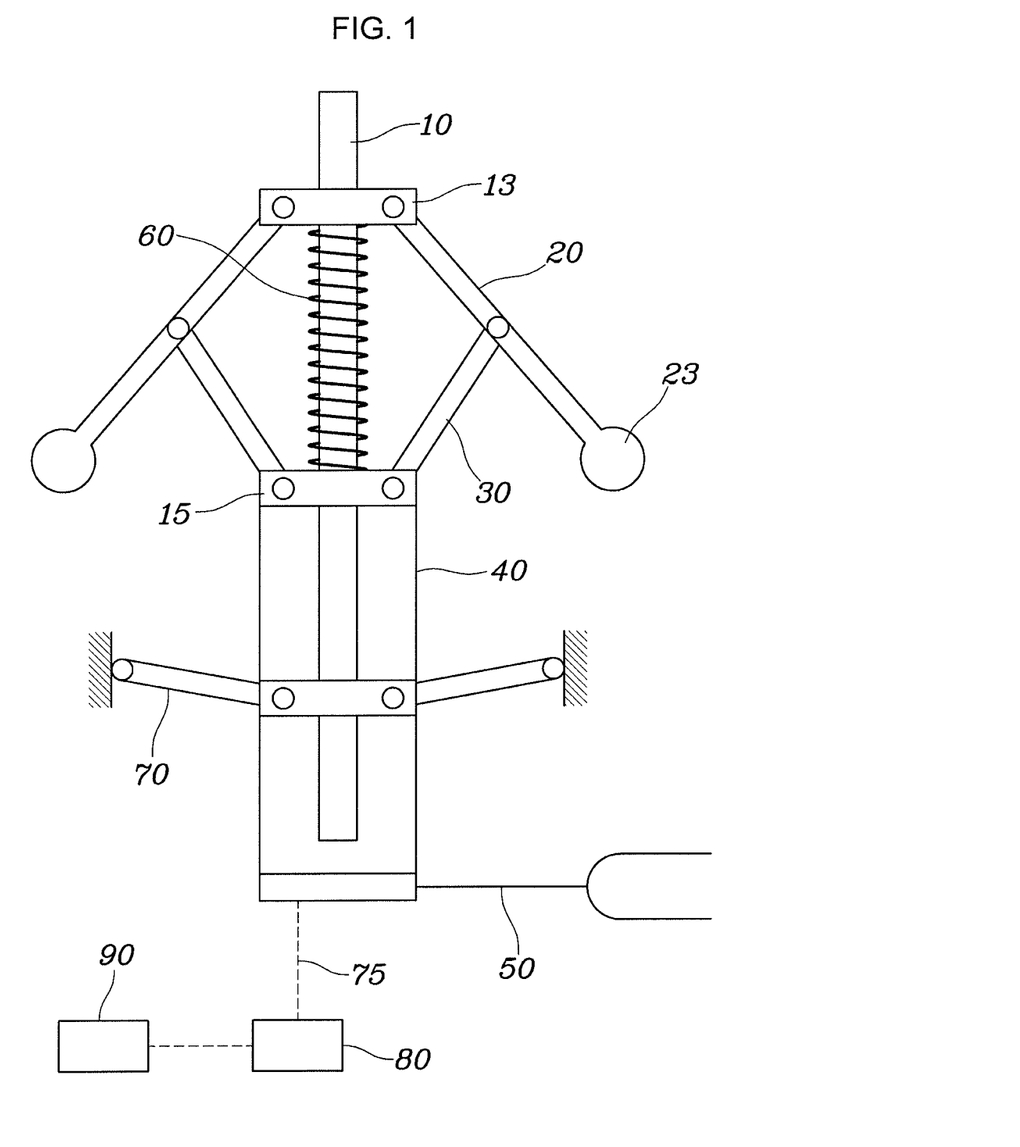
FIG. 1 is a view showing an operation of a vehicle automatic transmission according to one exemplary embodiment of the present invention when a vehicle is running at a low speed.
Figure 2:
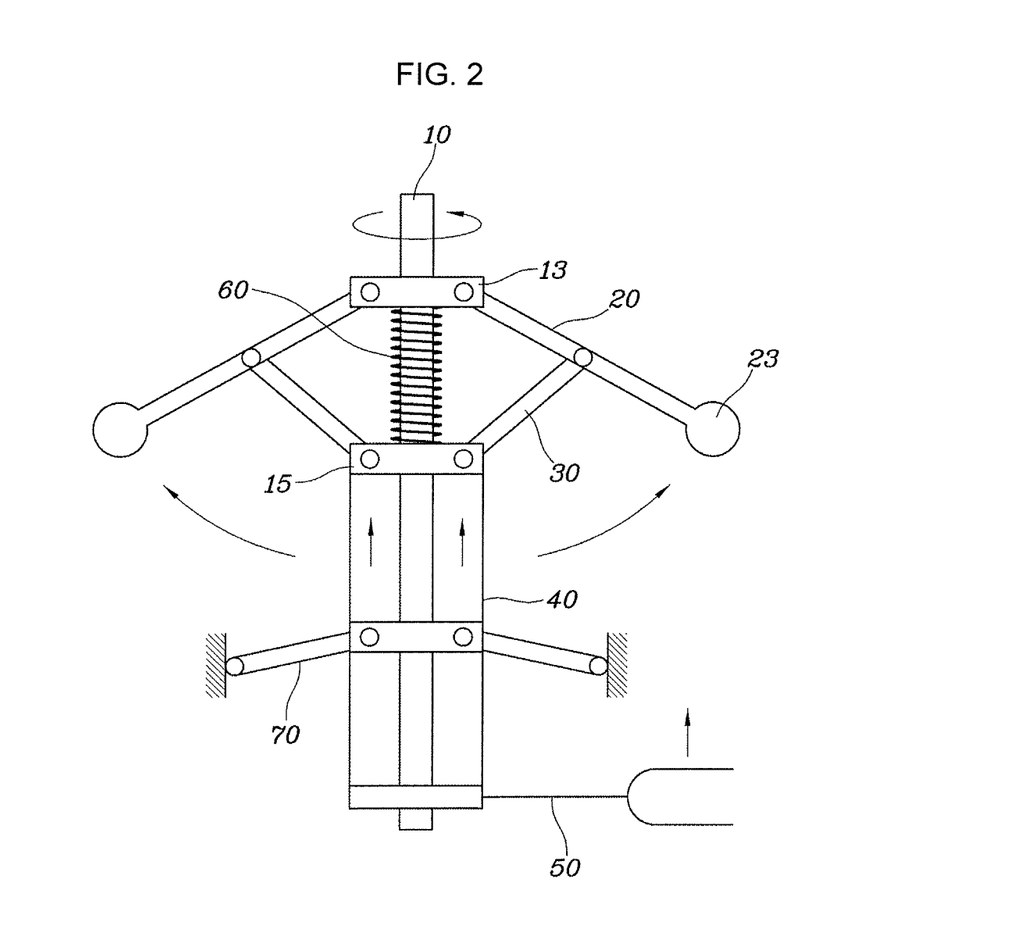
FIG. 2 is a view showing an operation of the vehicle automatic transmission according to one exemplary embodiment of the present invention when the vehicle is running at a high speed.

FIG. 1 is a view showing an operation state of an automatic transmission for a vehicle, according to one exemplary embodiment of the present invention, when the vehicle is running at a low speed, and FIG. 2 is a view showing an operational state of the automatic transmission when the vehicle is running at a high speed.

Referring to FIG. 1 and FIG. 2, according to one exemplary embodiment of the present invention, an automatic transmission for a vehicle may include: a rotation shaft 10 rotated by the driving power of the vehicle, a sliding device 40 mounted on the rotation shaft 10 and configured to be slidable up and down along an axial direction of the rotation shaft 10, a diaphragm spring 70 assembled with the sliding device 40 and deformed be oriented to a first side or a second side of the rotation shaft in the axial direction according to an axial position of the sliding device 40) on the rotation shaft, a shift fork 50 connected to the sliding device 40 or the diaphragm spring 70 and configured to control engagement of a synchronizer SL with a speed change gear according to the axial position of the sliding device 40, a sliding-device position adjuster 80 connected to the sliding device 40 and configured to adjust the axial position of the sliding device 40 on the rotation shaft 10 by causing the sliding device 40 to slide up and down along the axial direction of the rotation shaft 10, and a controller 90 for controlling the elastic force of the diaphragm spring by controlling the sliding-device position adjuster 80 according to the speed of the vehicle so that the sliding device 40 slides up and down along the axial direction of the rotation shaft according to the speed of the vehicle.

The automatic transmission according to an exemplary embodiment of the present invention may additionally include a first link 20 having a first end portion connected via a hinge to the rotation shaft 10 and a second end portion raised or lowered by a centrifugal force as the rotation shaft rotates, a second link 30 having a first end portion connected via a hinge to the first link 20 and a second end portion connected to a second end portion of the sliding device 40 such that the sliding device slides up and down along the axial direction of the rotation shaft as the first link 20 is raised or lowered, a first linkage portion 13 mounted on the rotation shaft and connected via a hinge to the first end portion of the first link 20, and a second linkage portion 15 mounted on the rotation shaft, positioned below the first linkage portion 13, connected via a hinge to the second end portion of the second link 30, and coupled to the sliding device at the bottom surface thereof, and a compression spring 60 mounted on the rotation shaft and disposed between the first linkage portion 13 and the second linkage portion 15 to exert an elastic force.

That is, according to an exemplary embodiment of the present invention, as the vehicle moves, the rotation shaft 10 rotates. As the rotation shaft 10 rotates, a centrifugal weight 23 of the first link 20 is raised or lowered due to the centrifugal force caused by the rotation of the rotation shaft and the first end portion of the first link 20 is pivoted on the hinge. At the present time, the sliding device 40 slides upward or downward. As a result, the diaphragm spring 70, which is assembled with the sliding device 40 to be deformed to be oriented to the first end portion or the second end portion of the rotation shaft in the axial direction according to the axial position of the sliding device 40 on the rotation shaft when the sliding device 40 slides upward or downward, is deformed. As the diaphragm spring 70 is deformed to be oriented toward the first end portion or the second of the rotation shaft, the shift fork 50 connected to the diaphragm spring 70 moves upward or downward, so that the synchronizer SL engages with or disengages from the speed change gear. In the present way, gear shifting of the vehicle is performed.

When the rotation speed of the rotation shaft 10 is increased, the first link 20 is raised and the sliding device 40 slides upward. As the sliding device 40 slides upward, the diaphragm spring 70 is deformed to be oriented toward the first end portion of the rotation shaft in the axial direction thereof, and the shift fork 50 may move upward at the present time.

On the other hand, when the rotation speed of the rotation shaft 10 is reduced, the first link 20 is lowered and the sliding device 40 accordingly slides downward. As the sliding device 40 slides downward, the diaphragm spring 70 is deformed to be oriented toward the second end portion of the rotation shaft in the axial direction and the shift fork 50 accordingly moves downward at the present time.

As described above, according to an exemplary embodiment of the present invention, there is no electronic controller that causes multiple synchronizers to engage with or disengage from the speed change gear through electronic control to change the vehicle speed. Instead of the electronic control, automatic gear shifting is conducted in a manner such that the multiple synchronizers are automatically engaged with or disengaged from the speed change gear through mechanical operations of components, which occur according to the vehicle speed.

Hereinafter, the detailed structure of the automatic transmission according to an exemplary embodiment of the present invention will be described.

The first link 20 is mounted on the rotation shaft 10 and connected via a hinge to the first linkage portion 13 to be pivoted on the hinge. The centrifugal weight 23 is provided at the second end portion of the first link 20 to enhance the centrifugal force generated due to the rotation of the rotation shaft 10.

The first end portion of the first link 20 is connected via the hinge to the first linkage portion 13 and the second end portion provided with the centrifugal addition 23 is raised or lowered by the centrifugal force when the rotation axis rotates. A middle portion of the first link 20 and the first end portion of the second link 30 are connected to each other by the hinge, and the second end portion of the second link 30 is connected by the hinge to the second linkage portion 15. Therefore, when the rotation shaft 10 is rotated and thus the first link 20 is raised or lowered, the first end portion of the second link 30 may be pivoted on the hinge provided at the middle portion of the first link 20.

The sliding device 40 may have a multi-ring combined shape including multiple rings that move axially together while surrounding the rotation shaft 10, or may have a single cylinder shape according to embodiments. That is, the shape of the sliding device 40 may be variously changed depending on designers or vehicles, and thus the shape of the sliding device 40 may not be limited to a specific shape.

The shift fork 50 may be connected to the sliding device 40 or the diaphragm spring 70 and thus may move according to the position of the sliding device 40 so that the synchronizer SL can engage with or disengage from the speed change gear. In the instant case, the shift fork 50 may be fixed to the diaphragm spring 70 or the sliding device 40 as to be collectively slidable. Furthermore, the shift fork 50 may be provided such that the synchronizer SL may be engaged with or disengaged from the speed change stage gear at the time when the diaphragm spring 70 is deformed. The engagement or disengagement of the synchronizer SL with or from the speed change gear according to the position of the sliding device 40 will be described later more specifically with reference to FIG. 6.

The compression spring 60 may be mounted on the rotation shaft and disposed between the first linkage portion 13 and the second linkage portion 15 to exert an elastic force, when the rotation shaft 10 rotates, the second end portion of the first link 20 is raised or lowered by the centrifugal force and the compression spring 60 may be compressed or relaxed.

The diaphragm spring 70 is mounted on the rotation shaft 10 and is coupled to the sliding device 40 to be deformed to be oriented toward the first end portion or the second end portion of the rotation shaft 10 in the axial direction according the position of the sliding device 40 on the rotation shaft 10. Here, the operation of deforming the diaphragm spring 70 to be oriented toward the first end portion or the second end portion of the rotation shaft 10 in the axial direction means an event that the direction of the elastic force applied by the diaphragm spring 70 is switched.

in an exemplary embodiment of the present invention, the diaphragm spring 70 may be constructed to be deformed toward the first end portion or the second end portion of the rotation shaft in the axial direction when the amount of deformation reaches a predetermined level. That is, when the load is applied to the diaphragm spring 70, the diaphragm spring 70 starts being deformed (i.e. bent). When the amount of deformation of the diaphragm spring 70 reaches the predetermined level after the load is applied to the diaphragm spring 70, the diaphragm spring 70 is flipped, so that the direction of the elastic force exerted by the diaphragm spring 70 may be switched.

That is, as the speed of the vehicle increases and the sliding device 40 slides upward due to the centrifugal force acting on the first link 20, a load (pressing force) is applied to the diaphragm spring 70 and the diaphragm spring 70 starts being deformed. When the predetermined amount of deformation is reached, the diaphragm spring 70 is deformed into a posture illustrated in FIG. 2, and the direction of the elastic force may be switched. Furthermore, since the shift fork 50 is provided such that a sleeve of the synchronizer starts engaging with or disengaging from the speed change gear at the time when the diaphragm spring 70 is deformed, the synchronizer may more easily engage with or disengage from the speed change gear due to the elastic force of the diaphragm spring 70. The diaphragm spring 70 may be provided such that a first end portion thereof is connected to the sliding device 40 and a second end portion thereof is fixed to a housing or the like to rotate together with the rotation shaft 10 but not to move in the axial direction thereof.

The sliding-device position adjuster 80 is connected to the sliding device 40 and adjusts the position of the sliding device 40 by causing the sliding device 40 to slide up and down along the axial direction of the rotation shaft 10. Additionally, the sliding-device position adjuster 80 controls the elastic force of the diaphragm spring 70 by adjusting the position of the sliding device 40 by causing the sliding device 40 to slide up and down along the axial direction of the rotation shaft 10.

Figure 3:
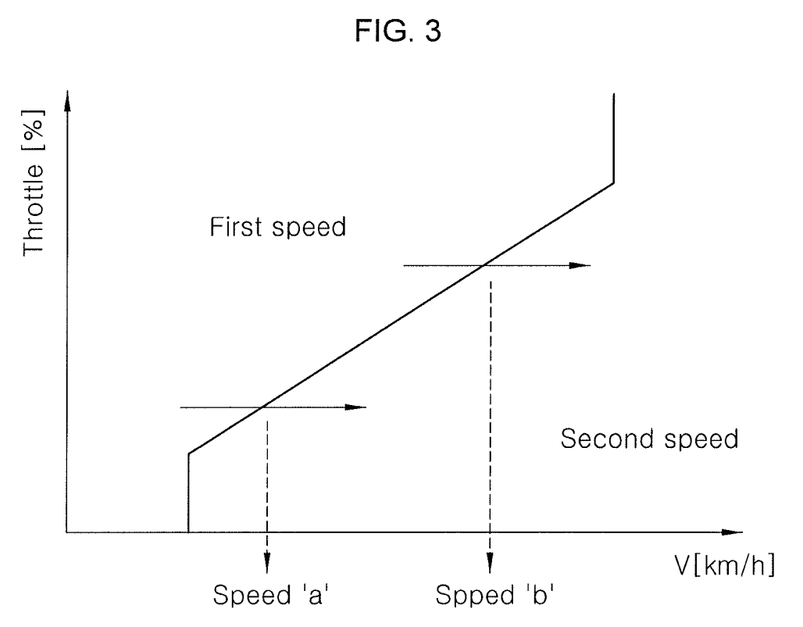
FIG. 3 is a diagram showing the shift map of a second-stage automatic transmission for a vehicle, according to one exemplary embodiment of the present invention.

FIG. 3 is a diagram showing a shift map of a two-speed transmission which is an automatic transmission for a vehicle according to one exemplary embodiment of the present invention. As illustrated in FIG. 3, when the speed change gear is shifted from a first gear to a second gear, the vehicle speed may not be constant. That is, the gear shifting from the first gear to the second gear may be performed not only when the vehicle is running at a specific speed equal to or over a predetermined value but also when the vehicle is running at speeds in a broad speed range including speeds under the above-mentioned specific speed. For the gear shifting to be appropriately performed when the vehicle is running at any speed within a range of various vehicle speeds, the elastic force of the diaphragm spring 70 may be adjusted by the sliding-device position adjuster 80 adjusting the position of the sliding device 40 in the axial direction of the rotation shaft.

According to an exemplary embodiment of the present invention, as the vehicle travels, the rotation shaft 10 rotates. Next, as the rotation shaft 10 rotates, the first link 20 ascends, causing the sliding device 40 to slide upward. The upward sliding motion of the sliding device 40 increases the load applied to the diaphragm spring 70 so that the diaphragm spring 70 may be deformed. When the deformation amount of the diaphragm spring 70 reaches a predetermined level, gear shifting is completed. That is, to perform gear shifting, a predetermined load needs to be applied to the diaphragm spring 70 so that the diaphragm spring 70 may be deformed by a predetermined deformation amount. However, the load applied to the diaphragm spring 70 when the vehicle travels at a high speed differs from the load applied to the diaphragm spring 70 when the vehicle travels at a low speed. Therefore, the sliding-device position adjuster 80 adjusts the position of the sliding device 40, controlling the elastic force of the diaphragm spring 70 so that the gear shifting may be reliably performed at various vehicle speeds.

As a specific example, when a load of 10 kg is applied to the diaphragm spring 70, at the time when a predetermined amount of deformation is reached, the diaphragm spring 70 is deformed to perform gear shifting. As shown in FIG. 3, therefore, the gear shifting is performed when the vehicle speed is A km/h and when the vehicle speed is B km/h in accordance with the shift map. For example, the load applied to the diaphragm spring is assumed to be 5 Kg when the vehicle speed is A km/h and the load applied to the diaphragm spring is assumed to be 10 kg when the vehicle speed is B km/h. In the instant case, when the vehicle speed is A km/h, although the gear shifting may be performed according to the shift map, since the load applied to the diaphragm spring is only 5 kg, the diaphragm spring cannot be deformed by the predetermined deformation amount. The sliding-device position adjuster 80 adjusts the elastic force of the diaphragm spring 70 by adjusting the position of the sliding device 40 so that the gear shifting may be appropriately performed at various vehicle speeds according to the shift map. That is, when the vehicle speed is A km/h, the sliding-device position adjuster 80 adjusts the position of the sliding device 40 so that an initial load of 5 kg is preliminarily applied to the diaphragm spring. When the vehicle travels at the speed of A km/h, the diaphragm spring may be deformed by a predetermined deformation amount so that the gear shifting may be performed.

Figure 4:
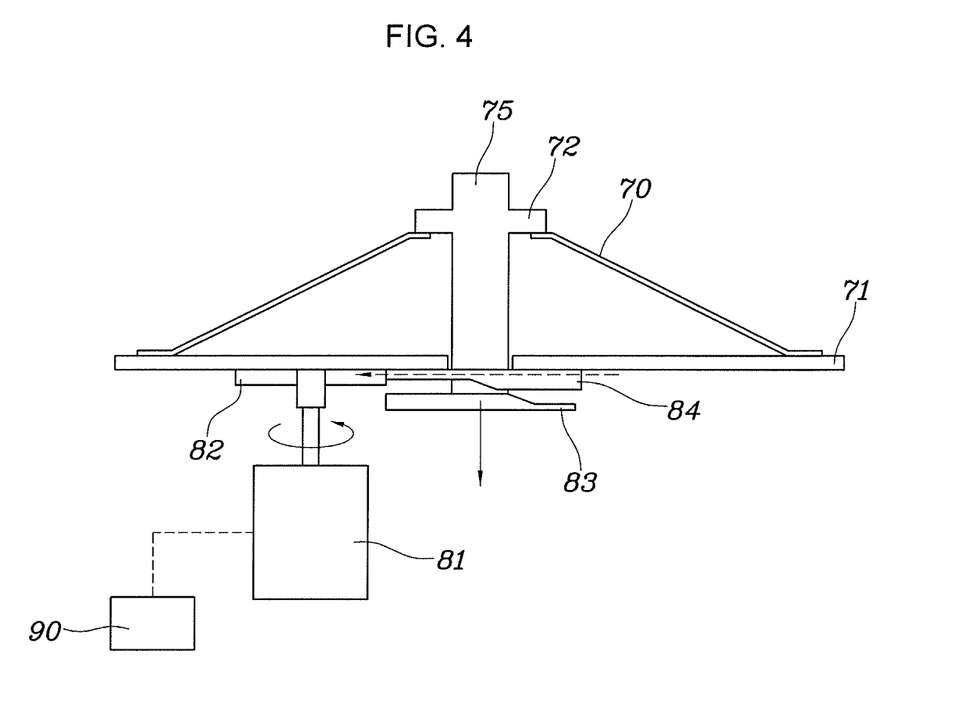
FIG. 4 is a detailed view of a sliding-device position adjuster of a vehicle automatic transmission according to various exemplary embodiments of the present invention.
Figure 5:
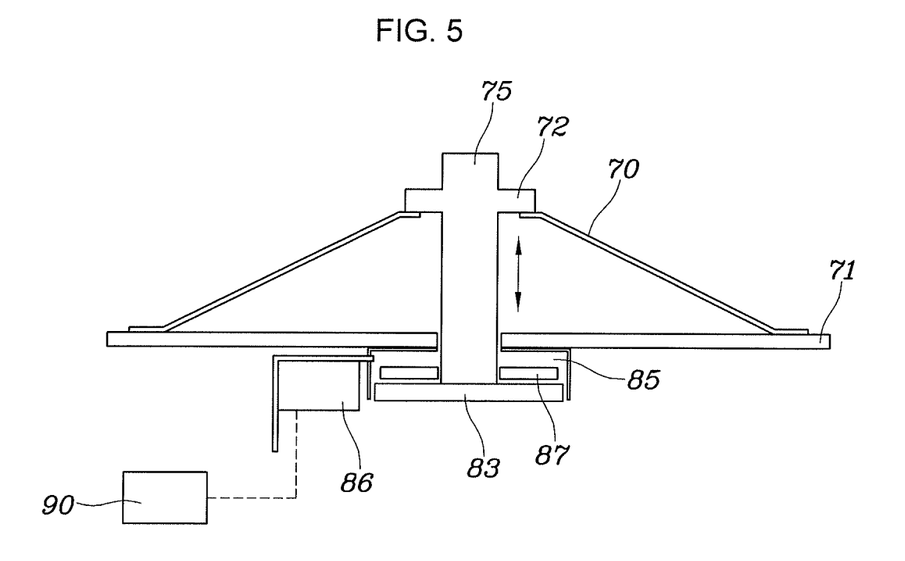
FIG. 5 is a detailed view of a sliding-device position adjuster of a vehicle automatic transmission according to various exemplary embodiments of the present invention.

FIG. 4 is a detailed view of a sliding-device position adjuster of an automatic transmission device configured for a vehicle according to various exemplary embodiments of the present invention. FIG. 5 is a detailed view of a sliding-device position adjuster of an automatic transmission according to various exemplary embodiments of the present invention.

As illustrated in FIG. 4, the sliding-device position adjuster 80 may include a motor 81, a cam gear 82 connected to the motor 81, and a position adjuster 83 connected to the cam gear 82 and assembled with the sliding device.

In an exemplary embodiment of the presently claimed invention, the sliding-device position adjuster 80 may include a support member 71 having a hole through which a connection shaft 75 coupled to a boss portion 72 passes through, and the diaphragm spring 70 is connected to the support member 71 and the boss portion 72. In an exemplary embodiment of the present invention, the connection shaft 75 may be stationary.

The cam gear 82 rotates in conjunction with rotation of the motor 81 connected to the cam gear 82, causing the sliding device connected to the connection shaft 75 to slide upward or downward along the axial direction of the rotation shaft. The sliding-device position adjuster 80 may further include a rotation cam 84 positioned above the position adjuster 83. In the instant case, according to various aspects of the present invention, when the motor 81 rotates counterclockwise to rotate a motor gear, the motor gear rotates the cam gear 82 and the cam gear 82 rotates the rotation cam 84 provided on an external surface of the cam gear 82. At the present time, the rotation cam 84 positioned above the position adjusting portion 83 pushes the position adjuster 83 downward to move the boss portion 72 coupled to the sliding device 40 downward. Thus, the present downward movement applies a load (force) to the diaphragm spring 70, adjusting the elastic force of the diaphragm spring 70. Conversely, when the motor 81 rotates in the clockwise direction thereof, the elastic force of the diaphragm spring 70 may be adjusted in reverse of the above-described manner.

As illustrated in FIG. 5, the sliding-device position adjuster 80 may include a support member 71 having a hole through which a connection shaft 75 coupled to a boss portion 72 passes through, and the diaphragm spring 70 is connected to the support member 71 and the boss portion 72. In an exemplary embodiment of the present invention, the connection shaft 75 may be stationary. The sliding-device position adjuster 80 may further include the position adjuster 83 assembled with the sliding device 40 via the connection shaft 75 and provided below the sliding device 40, a cylinder 85 provided on the support member 71 between the sliding device 40 and the position adjuster 83, a pressure providing device 86 for applying pressure to the cylinder 85, and a piston 87 provided inside the cylinder 85 and above the position adjuster 83 and configured to move in a vertical direction thereof, causing the connection shaft 75 coupled to the sliding device 40 to slide upward or downward. In the instant case, the pressure providing device 86 increases the pressure in the cylinder 85 so that the piston can move downward. At the present time, the boss portion 72 assembled with the sliding device 40 moves downward and applies a load to the diaphragm spring 70. In the present way, the elastic force of the diaphragm spring 70 may be adjusted. Here, when the pressure providing device provides the pressure, the pressure is a pneumatic pressure or a hydraulic pressure.

The controller 90 controls operation of the sliding-device position adjuster 80 according to the vehicle speed to adjust the elastic force of the diaphragm spring 70 by sliding the sliding device 40 up and down along the axial direction of the rotation shaft, so that the gear shifting may be appropriately performed in a range of various vehicle speeds.

Figure 6:
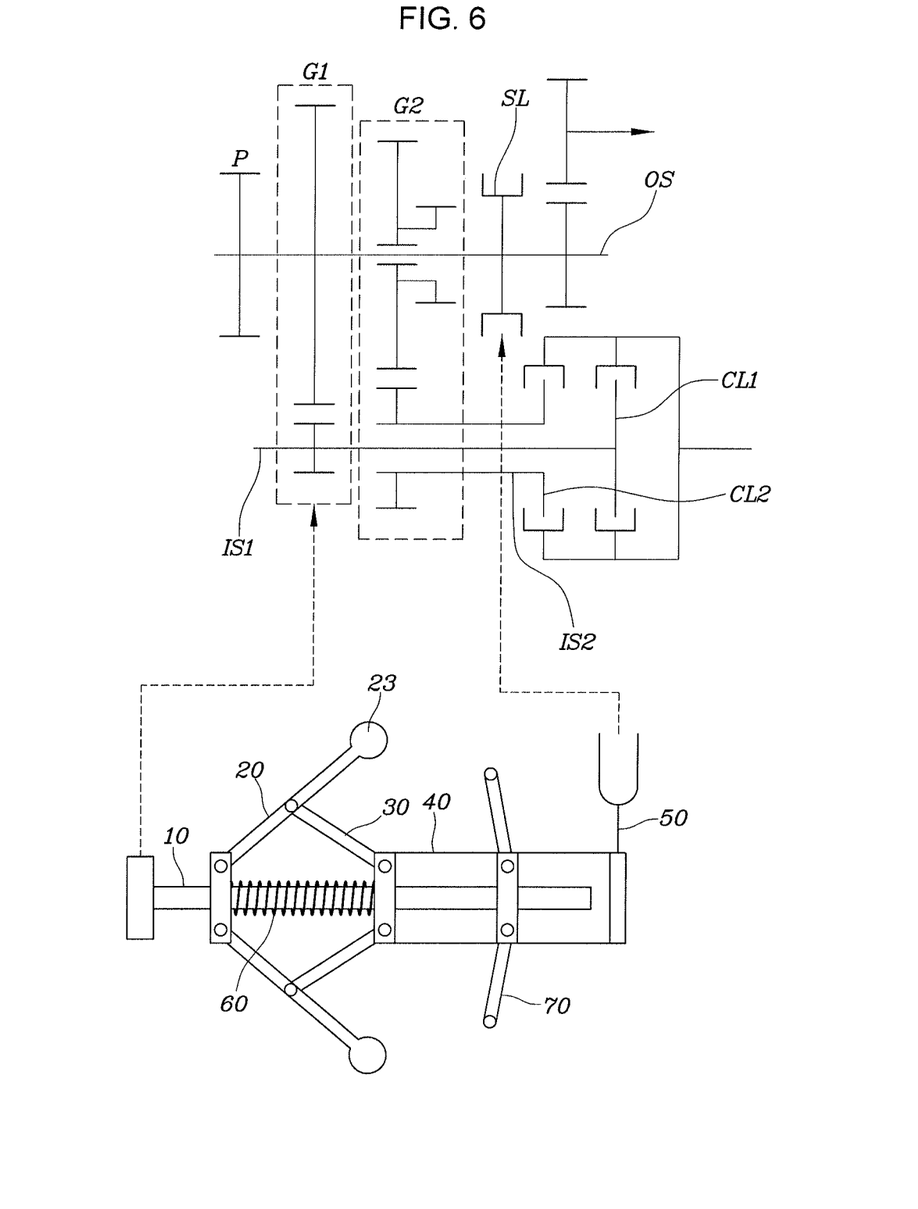
FIG. 6 is a schematic view showing the construction of a vehicle automatic transmission to which the exemplary embodiment of the present invention is applied.

FIG. 6 is a view schematically illustrating the construction of an automatic transmission for a vehicle, to which the exemplary embodiment of the present invention is applied. Referring to FIG. 6, the automatic transmission for a vehicle according to an exemplary embodiment of the present invention may be applied to a Dual Clutch Transmission (DCT) vehicle. As described above, as the vehicle moves, the following operations sequentially occur: the rotation shaft 10 rotates; the first link 20 is pivoted on the hinge by the centrifugal force in the direction in which the centrifugal weight 23 is raised or lowered; the sliding device 40 slides upward or downward; the diaphragm spring 70 is deformed toward the first end portion or the second end portion of the rotation shaft in the axial direction according to the position of the sliding device 40; the shift fork 50 connected to the sliding device 40 moves upward or downward; and the synchronizer SL engages with or disengages from the speed change gear to change the vehicle speed.

As described above, according to an exemplary embodiment of the present invention, there is no need to be provided with an electronic controller for causing a plurality of synchronizers to engage with or disengage from a speed change gear through electronic control for a vehicle speed change. Instead of the electronic control for gear shifting, the gear shifting is performed such that multiple synchronizers can engage with or disengage from a speed change gear according to mechanical operations of components according to vehicle speeds.

According to an exemplary embodiment of the present invention, the controller controls the sliding-device position adjuster according to the speed of the vehicle so that the sliding device can slide up and down along the axial direction of the rotation shaft, adjusting the elastic force of the diaphragm spring so that the gear shifting operation may be performed.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automatic transmission for a vehicle, the automatic transmission comprising:
    a rotation shaft rotated by driving power of a vehicle;
    a sliding device mounted on the rotation shaft and slidable up and down along an axial direction of the rotation shaft;
    a diaphragm elastic member coupled to the sliding device and deformed toward a first end portion or a second end portion of the rotation shaft in the axial direction thereof, according to a position of the sliding device;
    a shift fork connected to the sliding device or the diaphragm elastic member and configured to cause a synchronizer to engage with a speed change gear according to a position of the sliding device;
    a sliding-device position adjuster connected to the sliding device and adjusting a position of the sliding device by causing the sliding device to slide up and down along the axial direction of the rotation shaft; and
    a controller configured to control the sliding-device position adjuster according to a speed of the vehicle to adjust an elastic force of the diaphragm elastic member by causing the sliding device to slide up and down along the axial direction of the rotation shaft.

2. The automatic transmission according to claim 1, further including:
    a first link having a first end portion hingedly connected to the rotation shaft and a second end portion raised or lowered by centrifugal force when the rotation shaft rotates;
    a second link having a first end portion hingedly connected to the first link and a second end portion connected to the sliding device to cause the sliding device to slide upward or downward when the first link is raised or lowered;
    a first linkage portion mounted on the rotation shaft and hingedly connected to the first end portion of the first link;
    a second linkage portion mounted on the rotation shaft, disposed below the first linkage portion, and hingedly connected to the second end portion of the second link, and coupled to the sliding device at a bottom surface of the second linkage portion; and
    a compression elastic member mounted on the rotation shaft and disposed between the first linkage portion and the second linkage portion and configured to exert an elastic force to the first linkage portion and the second linkage portion.

3. The automatic transmission according to claim 2, wherein the sliding-device position adjuster adjusts the elastic force of the diaphragm elastic member by adjusting a position of the sliding device by causing the sliding device to slide upward or downward along the axial direction of the rotation shaft.

4. The automatic transmission according to claim 3, wherein the controller is configured to control the sliding-device position adjuster according to the speed of the vehicle to adjust a position of the sliding device by causing the sliding device to slide upward or downward along the axial direction of the rotation shaft, for adjusting the elastic force of the diaphragm elastic member.

5. The automatic transmission according to claim 1, wherein the sliding-device position adjuster includes:
    a motor connected to the controller;
    a cam gear connected to the motor;
    a rotation cam engaged to the cam gear; and
    a position adjuster connected to the rotation cam and the sliding device to selectively move when the motor rotates the cam gear, causing the sliding device to slide upward or downward along the axial direction of the rotation shaft.

6. The automatic transmission according to claim 5, wherein the sliding-device position adjuster further includes a connecting shaft coupled to the sliding device, the position adjuster, and the diaphragm elastic member and includes a support member rotatably supporting the rotation cam, and wherein the diaphragm elastic member is connected to the support member.

7. The automatic transmission according to claim 1, wherein the sliding-device position adjuster includes:
- a position adjuster coupled to the sliding device and disposed below the sliding device;
- a cylinder disposed between the sliding device and the position adjuster;
- a pressure providing device connected to the controller and configured to provide a pressure applied to the cylinder; and
- a piston provided in the cylinder and above the position adjuster and configured to move up or down when the pressure is applied to the cylinder to cause the sliding device to slide upward or downward therefrom.

8. The automatic transmission according to claim 7, wherein the sliding-device position adjuster further includes a connecting shaft coupled to the sliding device, the position adjuster, and the diaphragm elastic member and includes a support member slidably supporting the connection shaft, and, wherein the diaphragm elastic member is connected to the support member.

9. The automatic transmission according to claim 1, wherein, when a deformation amount of the diaphragm elastic member reaches a predetermined level, the diaphragm elastic member is deformed to be oriented toward the first end portion or the second end portion of the rotation shaft in the axial direction of the rotation shaft, and the shift fork is connected to the diaphragm elastic member or the sliding device so that the synchronizer starts engaging with a speed change gear at a time point when the diaphragm elastic member is deformed.

10. The automatic transmission according to claim 1, wherein the shift fork is fixedly coupled to the diaphragm elastic member or the sliding device to be collectively slidable.

* * * * *